(12) United States Patent
Bariaud et al.

(10) Patent No.: US 8,602,726 B2
(45) Date of Patent: Dec. 10, 2013

(54) SECTORED DISTRIBUTOR FOR TURBOMACHINE

(75) Inventors: Christian Bernard Bariaud, Orsay (FR); Sebastien Digard Brou De Cuissart, Paris (FR); Eric Rene Herzer, Houilles (FR); Bruno Marie Benjamin Jacques Richard, Chanteloup les Vignes (FR)

(73) Assignee: SNECMA, Paris (FR)

( * ) Notice: Subject to any disclaimer, the term of this patent is extended or adjusted under 35 U.S.C. 154(b) by 534 days.

(21) Appl. No.: 12/922,460

(22) PCT Filed: Mar. 17, 2009

(86) PCT No.: PCT/FR2009/000277
§ 371 (c)(1),
(2), (4) Date: Nov. 15, 2010

(87) PCT Pub. No.: WO2009/125078
PCT Pub. Date: Oct. 15, 2009

(65) Prior Publication Data
US 2011/0052380 A1 Mar. 3, 2011

(30) Foreign Application Priority Data
Mar. 19, 2008 (FR) ...................................... 08 01499

(51) Int. Cl.
*F01D 11/02* (2006.01)
(52) U.S. Cl.
USPC ..................................................... 415/174.4
(58) Field of Classification Search
USPC .......... 415/170.1, 171.1, 173.6, 173.7, 174.1, 415/174.4, 174.5
See application file for complete search history.

(56) References Cited

U.S. PATENT DOCUMENTS

| | | | | |
|---|---|---|---|---|
| 3,941,500 | A | * 3/1976 | Glenn | 415/136 |
| 4,295,785 | A | * 10/1981 | Lardellier | 415/173.7 |
| 4,604,030 | A | 8/1986 | Naudet | |
| 4,767,267 | A | 8/1988 | Salt et al. | |
| 5,062,767 | A | 11/1991 | Worley et al. | |
| 5,328,328 | A | * 7/1994 | Charbonnel et al. | 415/173.7 |
| 5,749,701 | A | * 5/1998 | Clarke et al. | 415/115 |

FOREIGN PATENT DOCUMENTS

| | | |
|---|---|---|
| EP | 0 146 449 | 6/1985 |
| GB | 2 198 489 | 6/1988 |

OTHER PUBLICATIONS

U.S. Appl. No. 12/989,019, filed Oct. 21, 2010, Digard Brou De Cuissart, et al.

* cited by examiner

*Primary Examiner* — Nathaniel Wiehe
*Assistant Examiner* — Jeffrey A Brownson
(74) *Attorney, Agent, or Firm* — Oblon, Spivak, McClelland, Maier & Neustadt, L.L.P.

(57) ABSTRACT

The invention relates to a sectored distributor (112) for a turbomachine, including two coaxial platforms mutually connected by radial blades, the inner platform (130) being connected to an annular partition (138) for suspending an annular mounting (140) carrying elements (136) made of material subject to abrasion, this mounting sliding circumferentially on the partition and comprising a means engaging with means corresponding to the inner periphery of the partition to ensure radial restraint of the mounting on this partition.

13 Claims, 3 Drawing Sheets

SECTORED DISTRIBUTOR FOR TURBOMACHINE

BACKGROUND OF THE INVENTION

1. Field of the Invention

This invention relates to a sectored distributor for a turbomachine such as a turbojet or a turboprop engine.

A turbomachine comprises turbine stages each comprising a rotor impeller and a distributor, each distributor being sectored, i.e. formed of several distributor segments arranged circumferentially end-to-end.

Each distributor segment comprises two coaxial annular platforms extending inside one another and connected together by substantially radial blades. The outer platform comprises means for fastening on an outer casing of the turbine. The inner platform is integral with a substantially radial annular partition which carries members made of abradable material, located radially inside the inner platform of the distributor. The members made of abradable material engage with annular lips carried by the rotor of the turbine in order to form seals of the labyrinth type.

In the event of substantial wear of the members made of abradable material, it is necessary to replace them with new ones during maintenance operation. With the current art, these members are fixed by brazing on the annular partition of the inner platform of the distributor. The replacing of the members made of abradable material requires a complete dismounting of the segments of the distributor, a machining of each distributor segment in order to remove the worn abradable members, and the brazing of new abradable members on the annular partition. It is then necessary to deposit an antioxidant protective coating on each distributor segment. This operation of replacing abradable members of a distributor is therefore long and expensive.

Moreover, the distributor segments are separated from each other with low play in the circumferential direction in order to authorise thermal dilatations of their platforms during operation. They are in addition subjected during operation to vibrations and relatively substantial dynamic stress which can result in static movements and deformations of these segments.

2. Description of the Related Art

It has already been proposed to rigidify the distributor using means for axial bearing formed on the inner platform segments of the distributor, the means for bearing of a platform sector being intended to engage with corresponding means formed on adjacent inner platform segments in order to limit the deformations of the distributor during operation.

With the current technique, these means for bearing comprise a very hard material called "stellite" which is deposited via a method of laser welding ("stelliting") which is long, expensive, difficult to implement, and which risks deteriorating the distributor segments. This technology is furthermore not able to be carried out on certain distributors of which the platforms have forms that are too complex (called 3D platforms).

BRIEF SUMMARY OF THE INVENTION

This invention has in particular for purpose to provide a simple, effective and economical solution to the problems of prior art, by simplifying the replacing of the members made of abradable material of the distributor, and by suppressing the stelliting of the segments of this distributor.

It proposes to this effect a sectored distributor for a turbomachine, formed of segments comprising two coaxial annular platforms, respectively inner and outer, connected together by substantially radial blades, the inner platform being integral with a substantially radial annular partition carrying members made of abradable material, characterized in that the members made of abradable material are fixed on a sectored annular mounting which comprises an annular groove exiting radially towards the exterior and wherein is engage and retained in the radial direction the inner periphery of the annular partition, each mounting segment comprising at one of its circumferential ends an opening for engaging and mounting on the annular partition of one or of several distributor segments, the mounting being carried out by displacing in the circumferential direction the mounting segment on this partition, and at the other of its circumferential ends means forming a stop in the circumferential direction and engaging with the annular partition of the or of one of the distributor segments in order to ensure the restraint in one direction in the circumferential direction of the annular partition in relation to the mounting segment.

In a simple manner, the annular partition of the inner platform is received in means for fastening provided on the mounting of the abradable members, which can slide on this partition. Contrary to prior art, the mounting of the abradable members is mounted in a removable manner on the partition, which facilitates the replacing of worn abradable members. It is sufficient in fact to dismount the annular mounting of the partition and to carry out the aforementioned operations of machining and brazing directly on this mounting, or simply replace this mounting carrying worn abradable members with a new mounting carrying new abradable members. The remounting of the mounting on the partition is furthermore relatively simple and rapid.

The invention further makes it possible to simplify the manufacture of each distributor segment which is obtained from foundry, as the mounting of the abradable elements is now carried out independently of these segments.

The annular mounting when it extends over several distributor segments further makes it possible to rigidify the distributor segments in such a way as to limit their vibrations and their static movements during operation, while still authorising their circumferential dilatations. It is therefore no longer required to deposit via stelliting a hard material on the means for axial bearing of the distributor segments, which makes it possible to eliminate this long and expensive operation, and to suppress the risk of deterioration of the distributor segments during this delicate operation.

The annular mounting is sectored and each mounting segment comprises at a circumferential end an opening for engaging and mounting on the partitions of the distributor segments, the montage being carried out by displacing the mounting segment in the circumferential direction on the distributor segments by circumferential sliding. Each mounting segment comprises at its other circumferential end means forming a stop in the circumferential direction and engaging with the partition of an adjacent distributor segment in order to provide the restraining in one direction in the circumferential direction of the distributor segments in relation to the mounting segment.

According to another characteristic of the invention, the mounting is in the form of a rail and is made from sheet metal, which makes it possible in particular to lighten the distributor substantially in relation to prior art.

The mounting can have a U- or C-shaped section of which the opening is oriented radially towards the exterior, this mounting comprising two substantially radial annular wings, respectively upstream and downstream, connected together at their inner peripheries by an inner cylindrical mounting wall of the members made of abradable material. The abradable members can be fastened on the mounting by brazing or by any other suitable technique.

Annular deflectors made of sheet metal can furthermore be fastened, for example by brazing, on the wings of the mounting. These annular deflectors are intended to engage with corresponding members of the rotor impellers located upstream and downstream of the distributor in order to limit the passage of air in the radial direction between the distributor and these rotor impellers.

Each wing of the mounting can be folded at its outer periphery in order to form a substantially cylindrical outer wall extending axially towards the opposite wing, the outer walls defining between them the annular groove of passage of the annular partition of a distributor segment.

Each outer wall of the mounting can be folded on the side of the annular partition in order to form an annular edge extending substantially radially towards the interior, these two annular edges being substantially parallel together and to the annular partition of the mounting. In mounting position, the partition is clamped between the outer walls or between the annular edges of the mounting, and is clamped radially between the outer walls or the annular edges of the mounting on the one hand, and the inner wall of the mounting on the other hand, which makes it possible in particular to limit the vibrations of the mounting during operation.

The partition comprises more preferably at its inner periphery circumferential shoulders forming a stop in the radial direction, these shoulders being housed between the wings of the mounting and engaging with the outer walls or the annular edges of the mounting in order to ensure its radial restraint on the partition.

The number of mounting segments can be less than the number of distributor segments. Each mounting segment can extend in the circumferential direction over an angular area corresponding to several distributor segments. Each mounting segment makes it possible in this case to connect and to rigidify several distributor segments.

The invention also relates to a turbomachine low-pressure turbine, comprising at least one sectored distributor of the aforementioned type, as well as a turbomachine, such as a turbojet or a turboprop engine, comprising at least one distributor such as described hereinabove.

BRIEF DESCRIPTION OF THE DRAWING

The invention shall be better understood and other details, characteristics and advantages of this invention shall appear more clearly when reading the following description provided by way of a non-restricted example and in reference to the annexed drawings, wherein.

DETAILED DESCRIPTION OF THE INVENTION

Figure 1:
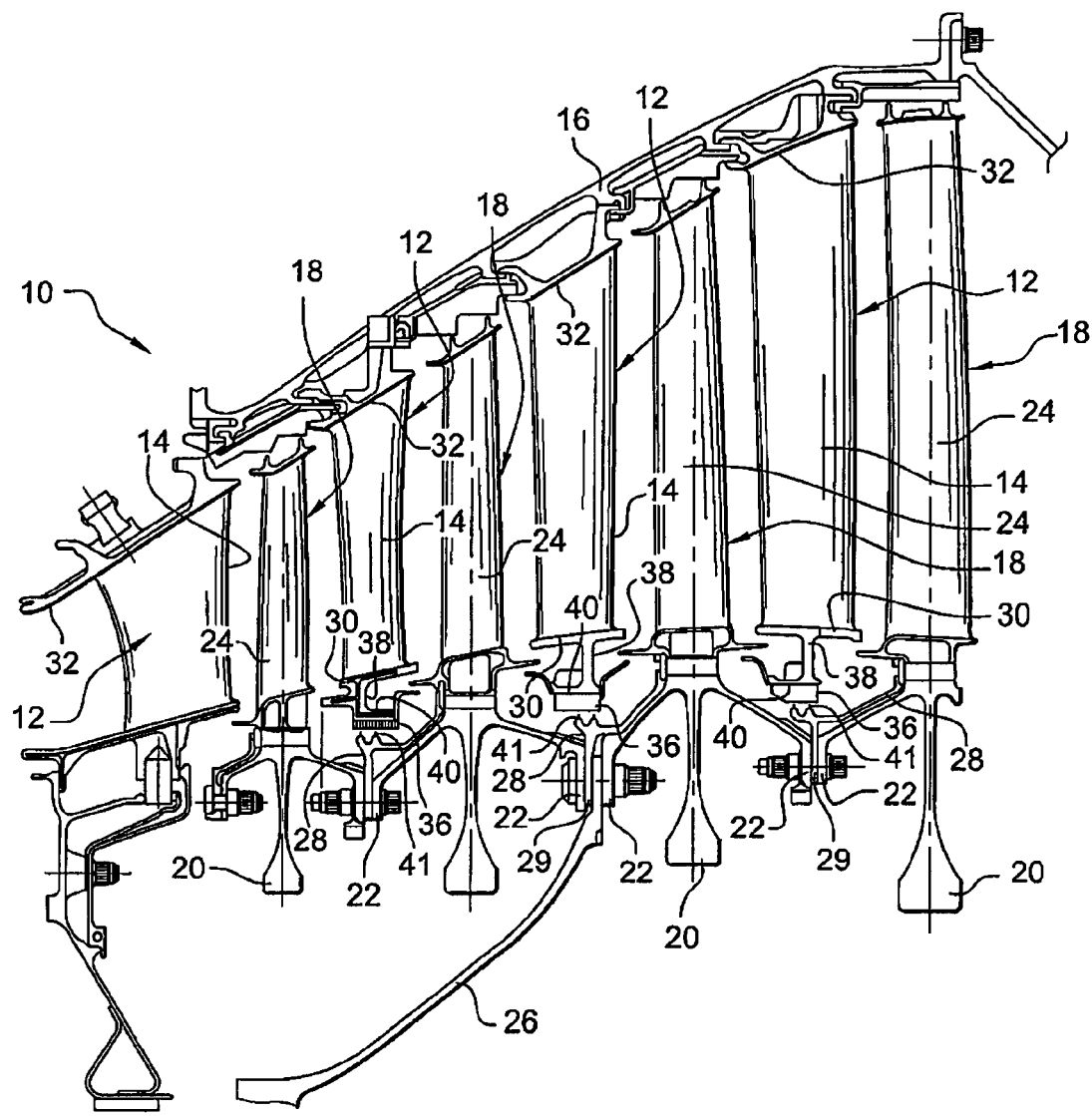
FIG. 1 is a diagrammatical axial section half-view of a turbomachine low-pressure turbine.

Reference is first made to FIG. 1 which shows a turbomachine low-pressure turbine 10 comprising four stages each comprising a distributor 12 carried by an outer casing 16 of the turbine and an impeller 18 located downstream of the distributor 12.

The impellers 18 include discs 20 assembled coaxially to each other by annular flanges 22 and carrying substantially radial vanes 24. These impellers 18 are connected to a turbine shaft (not shown) by the intermediary of a drive cone 26 fixed on annular flanges 22 of the discs.

Annular plates 28 for the axial retaining of the vanes 24 on the discs 20 are mounted between the discs and each include an inner radial wall 29 axially clamped between the annular flanges 22 of two adjacent discs.

The distributors 12 each include two annular coaxial platforms 30, 32, respectively inner and outer, which delimit between them the annular stream of gas flow in the turbine and between which extend substantially radial fixed blades 14. The outer platforms 32 of the distributors are fastened by suitable means on the outer casing 16 of the turbine.

The inner platform 30 of each distributor is integral with an annular partition 38 carrying annular members 36 made of abradable material, these members 36 being arranged radially inside the inner platform 30 of the distributor. In the example shown, the annular partition 38 is substantially radial and its outer periphery is connected to the inner surface of the inner platform 30 of the distributor. The abradable members 36 are fixed on the inner periphery of the annular partition 38.

The abradable members 36 are arranged radially outside and across from outer annular lips 41 carried by the plates 28. The lips 41 are intended to engage by friction with the members 36 in such a way as to form labyrinth-type seals and to limit the passage of air in the axial direction through these seals.

The distributors 12 of the turbine are sectored and are each formed of several segments arranged circumferentially end-to-end around the longitudinal axis of the turbine.

Figure 2:
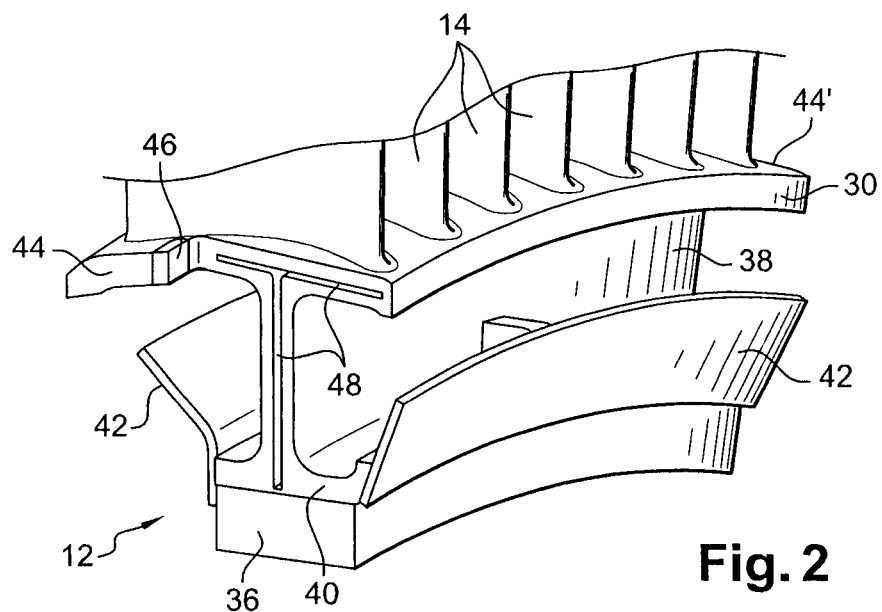
FIG. 2 is a partial diagrammatical view in perspective of a distributor segment, according to art prior to the invention.

FIG. 2 shows a portion of a distributor segment 12 according to the art prior to this invention. This distributor segment 12 comprises an inner platform segment 30 and an outer platform segment (not visible) connected together by seven blades 14. The inner platform segment 30 is integral with a partition segment 38 carrying abradable members 36. The platform sector 30 and the partition segment 38 are formed of a single piece of foundry.

In the current technique, the abradable members 36 are fixed by brazing on the inner periphery of the partition segment 38. Annular deflectors 42 made of sheet metal are furthermore fastened by brazing on the inner periphery of the partition segment 38, upstream and downstream of the abradable members 36. These deflectors engage via a baffle effect with the corresponding means of the impellers 18 located upstream and downstream of the distributor in order to limit the passage of gas in the radial direction between the distributor and these impellers.

The replacing of the abradable members 36 is in this case a long and expensive operation, as has been seen hereinabove.

Figure 3:
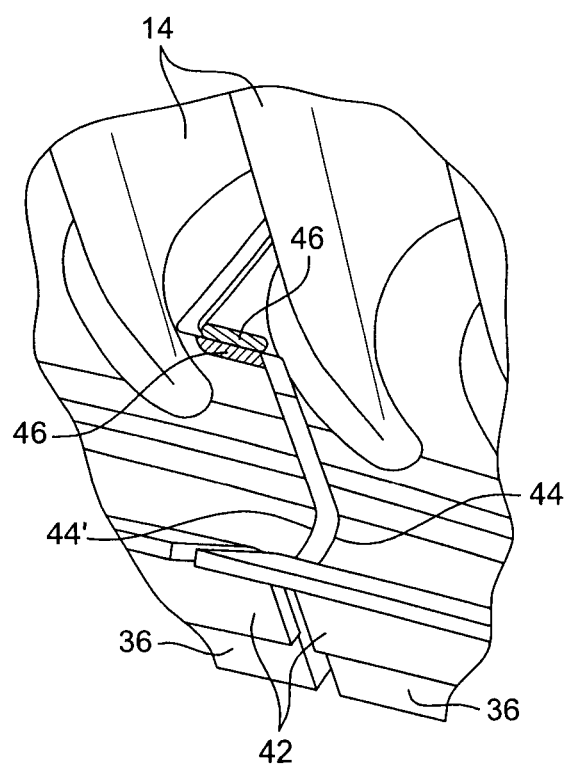
FIG. 3 is a diagrammatical view in perspective of the means for axial bearing between two adjacent distributor segments of prior art.

The longitudinal edges 44, 44' of the inner platform segment 30 of each distributor segment 12 have forms that are complementary with the corresponding longitudinal edges of the inner platform segments of the adjacent distributor segments, in such a way that the longitudinal edges are embedded circumferentially into one another during the mounting of this distributor (FIG. 3).

In the current technique, the longitudinal edges 44, 44' of the inner platform segments 30 are machined in Z in order to define means 46 of axial bearing between the distributor segments 12. The axial bearing of an inner platform segment 30 on an adjacent inner platform segment makes it possible to limit the static movements and the vibrations of the distributor segments 12 during operation of the turbine.

The means for bearing 46 comprise a hard material called "stellite" deposited by a method that is long, expensive, and very difficult to implement, such has also been described hereinabove.

Moreover, the longitudinal edges 44, 44' of the platform sector 30 and the radial edges of the partition segment 38 comprise straight slots 48 for housing the tabs providing a seal between the distributor segments. These slots 48 are obtained during an operation of machining that is relatively long and delicate, the radial slot formed on each radial edge of the partition segment 38 extending at its radially inner end to the immediate vicinity of the abradable members 36.

The invention makes it possible to overcome at least partially the problems indicated hereinabove thanks to an annular mounting 140 which is fastened in a removable manner on the annular partition 138 of the distributor and which carries the members made of abradable material 136.

Figure 4:
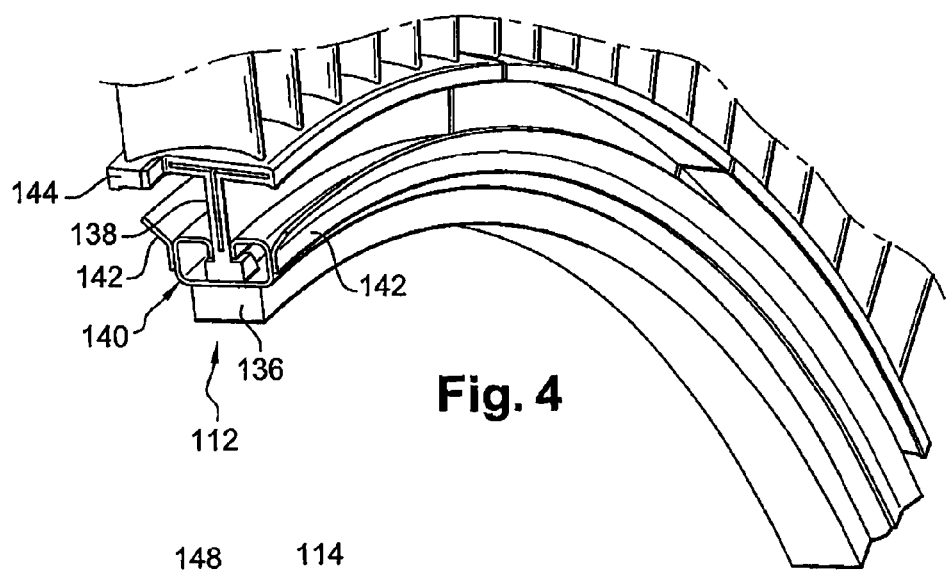
FIG. 4 is a partial diagrammatical view in perspective of a sectored distributor according to the invention.
Figure 5:
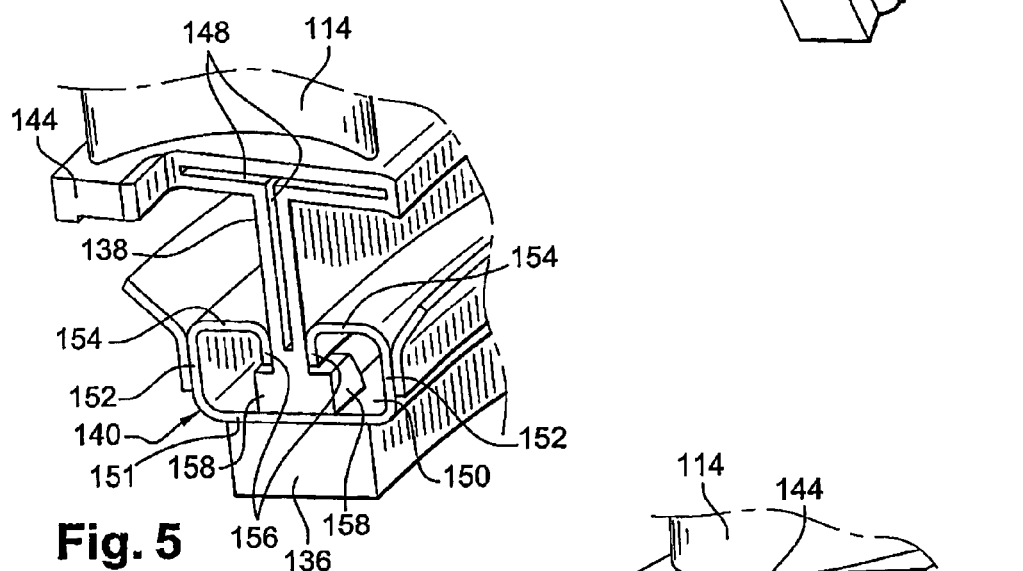
FIG. 5 is a view on a greater scale of a portion of FIG. 4 and shows a circumferential end of a mounting segment according to the invention.
Figure 6:
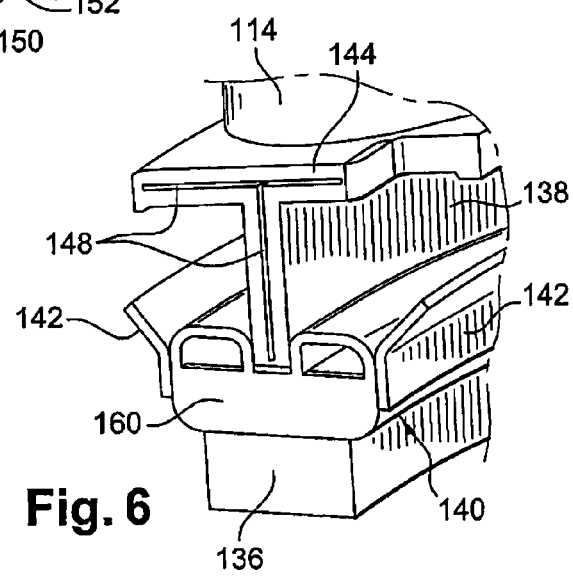
FIG. 6 is a diagrammatical view in perspective of the other circumferential end of the mounting segment in FIG. 4.

In the embodiment shown in FIGS. 4 to 6, the annular mounting 140 is in the form of a rail and is sectored, the mounting segments 140 being arranged end-to-end. The mounting segments 140 are made of sheet metal, for example from stamped sheet.

According to a characteristic of the invention, the number of mounting segments 140 is less than the number of distributor segments 112. By way of example, the number of distributor segments 112 is eighteen and the number of mounting segments is six, in such a way that each mounting segment 140 extends over an angular area corresponding to three consecutive distributor segments. In this case, each mounting segment connects three consecutive distributor segments of which the circumferential ends can be devoid of stellite.

Alternatively, each mounting segment can rigidify two or four consecutive distributor segments 140, and even more.

The longitudinal edges 144, 144' of the inner platform segments of each distributor can be conformed in Z, as in prior art, in order to conserve the axial bearing surfaces, or be of a straight section in order to suppress these axial bearing surfaces.

The annular mounting 140 according to the invention comprises an annular groove 150 exiting radially towards the exterior and wherein is engaged and retained in the radial direction the inner periphery of the radial partition 138. The mounting 140 is mounted and dismounted from the inner periphery of the partition 138 simply and rapidly, such as shall be described in more detail in what follows, which makes it possible to facilitate the replacing of the abradable members 136 when they are worn.

In the example shown, the mounting 140 has a U- or C-shaped section of which the opening exists radially towards the exterior. The mounting 140 comprises two substantially radial annular wings 152, respectively upstream and downstream. These wings 152 are substantially parallel together and connected together at their inner peripheries by a substantially cylindrical inner annual wall 151. Members 136 made of an abradable material are fastened, for example by brazing, on the inner surface of this inner cylindrical wall 151, and annular deflectors 142 made of sheet metal are also fastened by brazing on the wings 152.

Each wing 152 is folded at its outer periphery in such a way as to form a substantially cylindrical outer annular wall 154 extending axially towards the other wing. These outer cylindrical walls 154 are themselves folded at their axial ends located next to the opening of the groove 150 in order to form annular edges 156 extending substantially radially towards the interior, in the groove 150 of the mounting. The inner periphery of each annular edge 156 is at a radial distance from the inner wall 151, the radial dimension of the edges 156 being for example substantially equal to half of that of the wings 152.

These edges 156 are substantially parallel together and to the partition 138. They define here the opening of the groove 150 of the mounting 140. The axial distance between the faces across from the annular edges 156 is less than the thickness of the partition 138 in such a way that, in mounting position, the partition is maintained axially clamped between the edges 156 of the mounting 140.

The partition 138 of the distributor 112 has in the example shown an inverted T section and comprises at its inner periphery circumferential shoulders 158 intended to be housed in the groove 150 of the mounting, and to engage by bearing with the annular edges 156 and the inner wall 151 of the mounting in order to immobilise in the radial and axial direction the mounting 140 on the partition 138.

The width if the shoulders 158 in the axial direction is determined in such a way that the inner peripheral edges of the annular edges 156 are bearing radially towards the interior on the outer annular surfaces of these shoulders. The thickness of the shoulders 158 in the radial direction is determined in such a way that these shoulders are inserted with a radial clamping between the outer surface of the inner wall 151 and the inner peripheral edges of the edges 156.

The shoulders 158 can have an angular area equal to or less than that of the distributor segment. The distributor segment 112 can include of each side of the partition segment 138 several shoulders 158 at a circumferential distance from one another.

Each mounting segment 140 comprises an open circumferential end (FIG. 5) for the engagement and the mounting on a given number of distributor segments (three in the example shown), and an opposite circumferential end which is closed (FIG. 6) in order to retain the mounting segment in one direction in the circumferential direction on the distributor segments.

In the example shown in FIG. 6, the circumferential end of the mounting segment was closed via fixation, for example by brazing or welding, of a plate 160 on this circumferential end. This plate 160 forms a means of retaining on the distributor segments 112 in the circumferential direction. The plate 160 bears circumferentially in one direction on the partition segment 138 of the distributor segment 112 adjacent to this plate (FIG. 6). This plate 160 is blocked circumferentially in the opposite direction by bearing on the partition segment 138 of another distributor segment whereon is mounted an adjacent mounting segment.

In FIGS. 4 to 6, it can be seen that the slots 148 formed on the radial edges of the partition segment 138 are shorter than those of prior art and are therefore faster to carry out.

The annular mounting 140 is fastened on the distributor segments 112 in the following manner. Three distributor segments 112 are arranged end-to-end. A mounting segment 140 is arranged next to one of the distributor segments 112 in such a way that its open circumferential end is aligned in the circumferential direction with the shoulders 158 of the partition segment 138 of this distributor segment. The mounting segment 140 is then displaced in the circumferential direction in relation to the distributor segments 112 in such a way that the shoulders 158 of the distributor segments penetrate into the groove 150 of the mounting segment, being inserted between the inner peripheral edges of the annular edges 156 of the mounting segment and the inner cylindrical wall 151 of the mounting segment, and that the partition segments 138 are engaged between the annular edges 156 of the mounting segment. This results in a slight axial separation of the annular edges 156. The mounting segment 140 is displaced by circumferential sliding on the partition segments 138 until its plate 160 bears on one of the distributor segments 112. These operations are repeated for each mounting segment (in the number of six in the example described) then all of the distributor segments whereon are fastened the mounting segments are arranged flat and end-to-end in such a way as to form the distributor. A suitable tool is then used to grasp the entire distributor and mount it directly on the casing of the turbine. The aforementioned operations are carried out in the opposite order in order to dismount the distributor, and pour the replacing of the mounting 140 or of a mounting segment according to the invention.

The invention claimed is:

1. A sectored distributor for a turbomachine, formed of segments comprising:

two coaxial annular platforms, respectively inner and outer, connected together by substantially radial blades, the inner platform being integral with a substantially radial annular partition carrying members made of abradable material, wherein the members made of abradable material are fixed on a sectored annular mounting that comprises an annular groove exiting radially towards the exterior and is engaged and retained in the radial direction the inner periphery of the annular partition, each mounting segment comprising at one of its circumferential ends an opening for engaging and mounting on the annular partition of one or plural distributor segments, the mounting being carried out by displacing in the circumferential direction the mounting segment on the partition, and each mounting segment comprising at the other of its circumferential ends means forming a stop in the circumferential direction and engaging with the annular partition of one of the distributor segments to provide for the restraining in one direction in the circumferential direction of the annular partition in relation to the mounting segment.

2. A sectored distributor according to claim 1, wherein the mounting is in a form of a rail and is made from sheet metal.

3. A sectored distributor according to claim 2, wherein the mounting has a U- or C-shaped section of which the opening is oriented radially towards the exterior, the mounting comprising two substantially radial annular wings, respectively upstream and downstream, connected together at their inner peripheries by an inner cylindrical mounting wall of the members made of abradable material.

4. A sectored distributor according to claim 3, wherein annular deflectors made of sheet metal are fixed, or brazed, on the wings of the mounting.

5. A sectored distributor according to claim 3, wherein each wing of the mounting is folded at its outer periphery to form a substantially cylindrical outer wall extending axially towards the opposite wing, the outer walls defining between them the annular groove of passage of the annular partition of a distributor segment.

6. A sectored distributor according to claim 5, wherein each outer wall of the mounting is folded on the side of the annular partition to form an annular edge extending substantially radially towards the interior, the two annular edges being substantially parallel together and to the annular partition.

7. A sectored distributor according to claim 5, wherein, in mounting position, the inner periphery of the partition is clamped between the outer walls or between the annular edges of the mounting.

8. A sectored distributor according to claim 5, wherein, in mounting position, the inner periphery of the partition is radially clamped between the outer walls or the annular edges of the mounting and the inner wall of the mounting.

9. A sectored distributor according to claim 5, wherein the partition comprises at its inner periphery circumferential shoulders forming a stop in the radial direction, the shoulders being housed between the wings of the mounting and engaging with outer walls or annular edges of the mounting to provide the radial restraining of the mounting on the partition.

10. A sectored distributor according to claim 1, wherein a number of mounting segments is less than a number of distributor segments.

11. A sectored distributor according to claim 1, wherein each mounting segment extends in the circumferential direction over an angular area corresponding to plural distributor segments.

12. A turbomachine low-pressure turbine, comprising at least one sectored distributor according to claim 1.

13. A turbomachine, or a turbojet, or a turboprop engine, comprising at least one sectored distributor according to claim 1.

* * * * *

UNITED STATES PATENT AND TRADEMARK OFFICE
CERTIFICATE OF CORRECTION

PATENT NO. : 8,602,726 B2  Page 1 of 1
APPLICATION NO. : 12/922460
DATED : December 10, 2013
INVENTOR(S) : Christian Bernard Bariaud et al.

It is certified that error appears in the above-identified patent and that said Letters Patent is hereby corrected as shown below:

In the Specification

Column 4, Lines 49-53:
Change "These deflectors engage via a battle effect with the corresponding means of the impellers 18 located upstream and downstream of the distributor in order to limit the passage of gas in the radial direction between the distributor and these impellers." should be --These deflectors 42 engage via a battle effect with the corresponding means of the impellers 18 located upstream and downstream of the distributor in order to limit the passage of gas in the radial direction between the distributor and these impellers.--.

Signed and Sealed this
Third Day of June, 2014

Michelle K. Lee
*Deputy Director of the United States Patent and Trademark Office*